(12) United States Patent
Joseph

(10) Patent No.: US 6,450,797 B1
(45) Date of Patent: Sep. 17, 2002

(54) COMPACT SLIDE ACTUATION MOLD

(75) Inventor: Ealias C. Joseph, Markham (CA)

(73) Assignee: Stackteck Systems Limited, Brampton (CA)

( * ) Notice: Subject to any disclaimer, the term of this patent is extended or adjusted under 35 U.S.C. 154(b) by 7 days.

(21) Appl. No.: 09/795,150

(22) Filed: Mar. 1, 2001

(51) Int. Cl.⁷ .............................................. B29C 45/44
(52) U.S. Cl. ........................ 425/556; 264/318; 425/809; 425/DIG. 5; 425/DIG. 58
(58) Field of Search ................................. 425/441, 556, 425/809, DIG. 5, DIG. 58

(56) References Cited

U.S. PATENT DOCUMENTS

| 447,675 A | 3/1891 | Frank |
| 829,380 A | 8/1906 | Ball |
| 1,335,525 A | 3/1920 | Patterson |
| 2,047,379 A | 7/1936 | Matson |
| 2,076,377 A | 4/1937 | Loewenstein |
| 3,650,653 A | 3/1972 | Erickson |
| 3,811,645 A | 5/1974 | Feist |
| 4,140,464 A | 2/1979 | United States |
| 4,207,051 A | 6/1980 | Wright et al. |
| 4,274,617 A | 6/1981 | United States |
| 4,718,845 A | 1/1988 | Sheffield et al. |
| 4,889,480 A | 12/1989 | Nakamura et al. |
| 4,998,875 A | 3/1991 | Starkey |
| 5,312,243 A | 5/1994 | Mertz |
| 5,776,521 A | * 7/1998 | Wright et al. ................ 264/318 |
| 5,895,670 A | 4/1999 | Jaroschek et al. |
| 5,908,597 A | 6/1999 | Broudreau et al. |
| 6,036,472 A | * 3/2000 | Boudreau et al. ........... 425/556 |
| 6,171,094 B1 | 1/2001 | Von Holdt |
| 6,238,202 B1 | * 5/2001 | Joseph ........................ 425/556 |

FOREIGN PATENT DOCUMENTS

| DE | 36 14 119 A | 10/1987 |
| EP | 0 876 894 | 11/1998 |

* cited by examiner

Primary Examiner—Tim Heitbrink
(74) Attorney, Agent, or Firm—Ridout & Maybee LLP

(57) ABSTRACT

A molding apparatus has a pair of slide inserts which are laterally movable into and out of engagement with the other mold components. The lateral movement of the slide inserts is provided by a slide mechanism having a driving rack, a pair of drive pinions at either end of the driving rack, two pairs of driven racks and a plurality of slides connected to the driven racks. The driven racks of each pair are parallel and spaced from one another, engaging opposite sides of a pinion and thereby being driven in opposite directions by rotation of the pinion. The molding apparatus is more compact than conventional devices having slide inserts, eliminates the use of slide retainers, eliminates obstructions between the mold plates when the plates are separated, and can cycle faster than conventional devices.

18 Claims, 9 Drawing Sheets

COMPACT SLIDE ACTUATION MOLD

FIELD OF THE INVENTION

The present invention relates to slide core molds for use in injection molding, and more specifically to slide mechanisms employed in such molds.

BACKGROUND OF THE INVENTION

Conventional molds for injection molding typically comprise mating parts, such as a core and a cavity, which abut each other at a parting line and are moved directly away from each other along a machine axis during opening of the mold.

Such molds may also include one or more mold components which form an undercut portion of the article to be molded. These mold components, also to herein as "slide inserts", are moved laterally into and out of engagement with the other mating parts of the mold during closing and opening of the mold. Usually, a pair of such slide inserts is provided, one slide insert on each side of the mold. During mold opening, the slide inserts are moved outwardly in opposite directions from the other mating parts of the mold. Molds which include such laterally movable components are referred to herein as "slide core molds".

Presently used mechanisms for opening and closing slide core molds typically include slide blocks on which the slide inserts are mounted. Usually, these slide blocks are slidably mounted on the mold plate which carries the core, with one slide block being provided on each side of the mold. Lateral movement of the slide blocks is accomplished by providing angled horn pins mounted to the mold plate which carries the cavity. The horn pins extend through angled apertures in the slide blocks. As the core is separated from the cavity, the slide blocks slide along the horn pins, resulting in outward displacement of the slide blocks and the associated slide inserts from the other mating parts of the mold.

Examples of this type of mechanism are described in U.S. Pat. No. 3,811,645 issued May 21, 1974 to Feist and U.S. Pat. No. 4,889,480 issued Dec. 26, 1989 to Nakamura et al. These two pat. are actually concerned with slide retainers which are required in this type of slide core mold since the horn pins and the apertures in the slide blocks may become misaligned when the mold is opened, preventing reinsertion of the horn pins into the slide blocks.

Conventional slide mechanisms have several disadvantages. Firstly, conventional slide mechanisms include components such as cams which must be mounted on the outside of the mold and which increase the size of the mold. Some conventional slide retainers, such as the pull rod/compression spring retainer shown in FIG. 2 of the Feist patent, also include components which project from the sides of the mold. These components have the effect of enlarging the mold, reducing the number of mold cavities which can be fitted into a molding apparatus of a given size.

In addition, components such as cams and/or horn pins project from the parting line face and obstruct the space between the mold plates during ejection of the molded parts from the core. Since these components are lubricated, contact with the molded parts during ejection can result in product contamination.

Another disadvantage of conventional slide mechanisms is that these mechanisms are actuated as the mold opens and closes. This requires that the opening and closing of the mold be slowed down In order to avoid damaging the relatively delicate slide inserts, thereby lengthening the mold cycle time.

Therefore, the need exists for an effective slide mechanism which eliminates or reduces the size and/or number of components projecting from the outside of the mold. It would also be desirable to provide a slide mechanism which eliminates the need for a slide retainer to reduce the size and complexity of the mechanism, which also eliminates obstructions between the mold plates, and which can be actuated independently of opening and closing the mold.

SUMMARY OF THE INVENTION

The present invention overcomes at least some of the disadvantages of the prior art by providing a molding apparatus having a slide mechanism which is more compact than conventional slide mechanisms, does not form obstructions between the open mold plates, eliminates the need for slide retainers, and does not depend on mold opening and closing for actuation.

The molding apparatus according to the present invention comprises at least two mold plates which preferably carry a plurality of mold cores and mating mold cavities which form a plurality of molds. Each mold has a pair of laterally movable mold elements which are movable toward and away from each other. The mold elements of each mold are mounted on a pair of slides positioned on either side of the mold.

The mechanism for moving the mold elements between their inner and outer positions includes a reciprocating driving rack which drives at least one pinion. Each pinion drives a pair of driven racks which are movable in opposite directions, each of the racks being connected to one of the slides. Therefore, movement of the driving rack results in lateral movement of the slides and the associated mold components inwardly or outwardly in relation to the mold.

Since the apparatus of the invention does not utilize horn pins, misalignment of the slides during opening and closing is not a problem, and therefore slide retainers are not required. The slide mechanism of the present invention is compact and is recessed into the stripper plate, away from the mold parting line. This reduces the overall size of the mold and eliminates obstructions between the mold plates, thereby reducing the risk of contamination of parts being ejected from the molds. Furthermore, the slide mechanism does not rely on mold opening and closing for actuation since the driven racks are preferably actuated by a pneumatic cylinder after the mold is opened and retracted before it is closed, thereby allowing a shorter mold cycle time.

BRIEF DESCRIPTION OF THE DRAWINGS

The invention will now be described, by way of example only, with reference to the accompanying drawings in which.

DETAILED DESCRIPTION OF PREFERRED EMBODIMENTS

Figure 1:
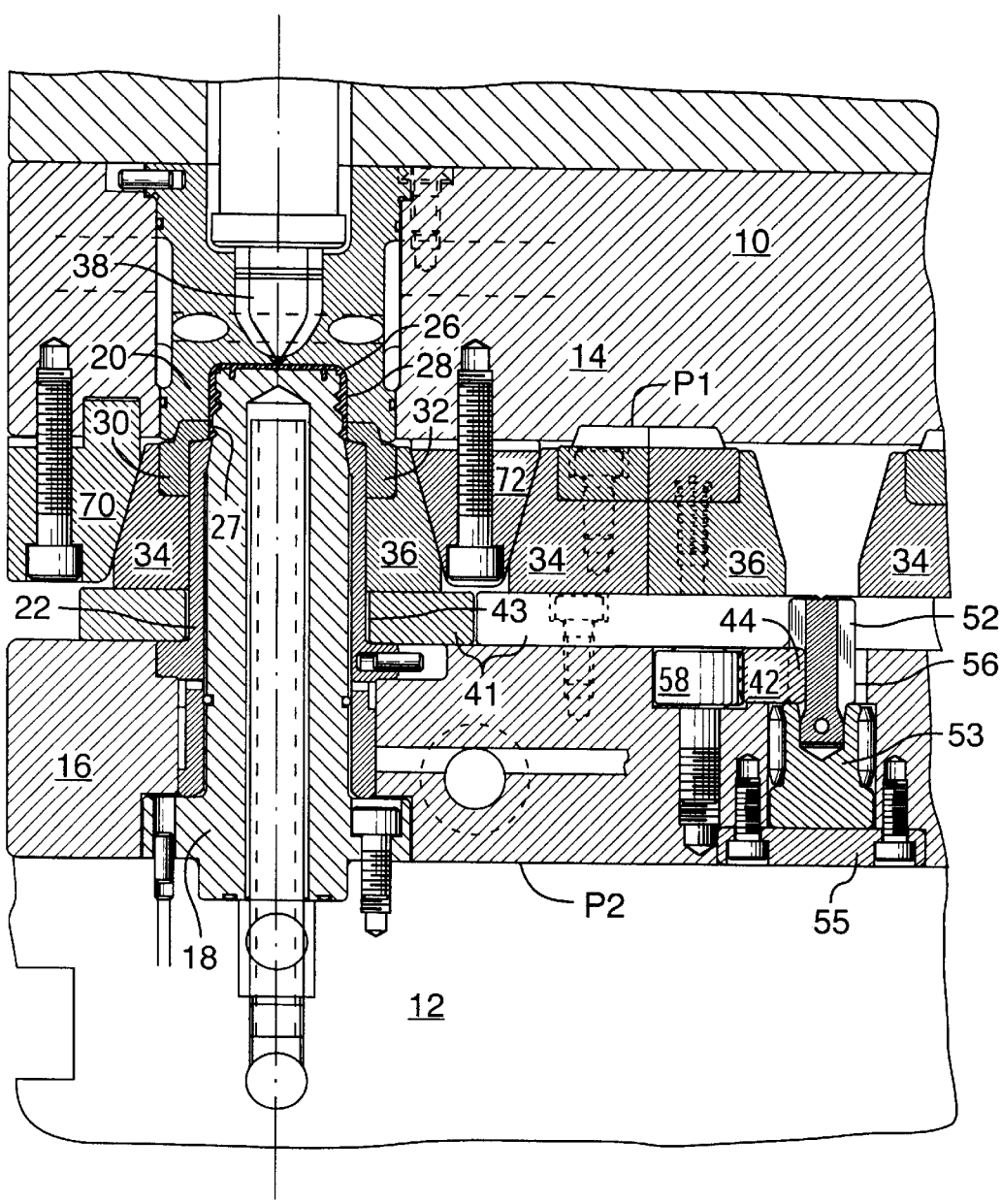
FIG. 1 is a cross-sectional view through one mold of an injection molding apparatus in a plane parallel to a direction in which the slides are moved, showing the mold in the closed position.

A preferred molding apparatus according to the present invention is generally indicated by reference numeral 10 in the drawings. The molding apparatus 10 comprises three mold plates, namely a mold core plate 12, a mold cavity plate 14 and a mold stripper plate 16 between the core plate 12 and cavity plate 14. A mold core 18 is mounted in the mold core plate 12, a mold cavity 20 is mounted in the mold cavity plate 14, and an annular stripper ring 22 is mounted in the mold stripper plate 16 and surrounds the mold core 18.

Both the core plate 12 and stripper plate 16 are movable along a machine axis to move the mold plates between a mold closed position and a mold open position. The stripper plate 16 is movable along tie rods 24 (FIG. 5) relative to the core plate 12 in order to strip a molded part 26 from the core 18. The stripper plate 16 is preferably actuated by machine ejector rods (not shown) which advance the stripper plate 16 along the machine axis.

The molded part 26 shown in the drawings comprises a threaded closure for a container having a tamper-evident skirt which is separable from the remainder of closure 26 by a line of pre-weakening 27. The molten plastic which forms molded part 26 is injected into mold 28 through injection nozzle 38.

The cavity plate 14 and stripper plate 16 abut each other at a first parting line P1 in the mold closed position (FIG. 1), and the core plate 12 and the stripper plate 16 likewise abut each other along second parting line P2 in the mold closed position. With the plates 12,14 and 16 in the mold closed position, a mold 28 is formed in which the molded part 26 is formed. The mold 28 is formed between the mold core 18 and the mold cavity 20. The radially inner portion of the upper surface of the stripper ring 22 also forms part of mold 28 at the lower peripheral edge of the molded part 26.

As illustrated in the drawings, the apparatus 10 also comprises a plurality of laterally-movable mold elements. A pair of such mold elements are provided for each mold 28. In the preferred embodiment shown in the drawings, each pair of laterally-movable mold elements comprises slide inserts 30 and 32 mounted on slide bars 34 and 36, respectively. The slide inserts 30 and 32 are each semi-circular in shape and combine to form a split insert which combines with the stripper ring 22, the core 18 and the cavity 20 to form mold 28. In the preferred embodiments shown in the drawings, the slide inserts 30 and 32 each have a radially inner molding surface which is provided with an undercut portion to form the line of pre-weakening 27 separating the skirt from the main body of molded part 26.

The mold 28 is opened and part 26 is removed from the mold 28 by first separating the cavity plate 14 from the stripper plate 16 (FIG. 2), laterally moving the slide inserts 30 and 32 and their associated slide bars 34 and 36 away from core 18 (FIG. 3), and then separating stripper plate 16 from core plate 12 (FIG. 4), thereby advancing stripper ring 22 along the machine axis to strip the part 26 from the core 12. These steps will be described in greater detail below.

Figure 5:
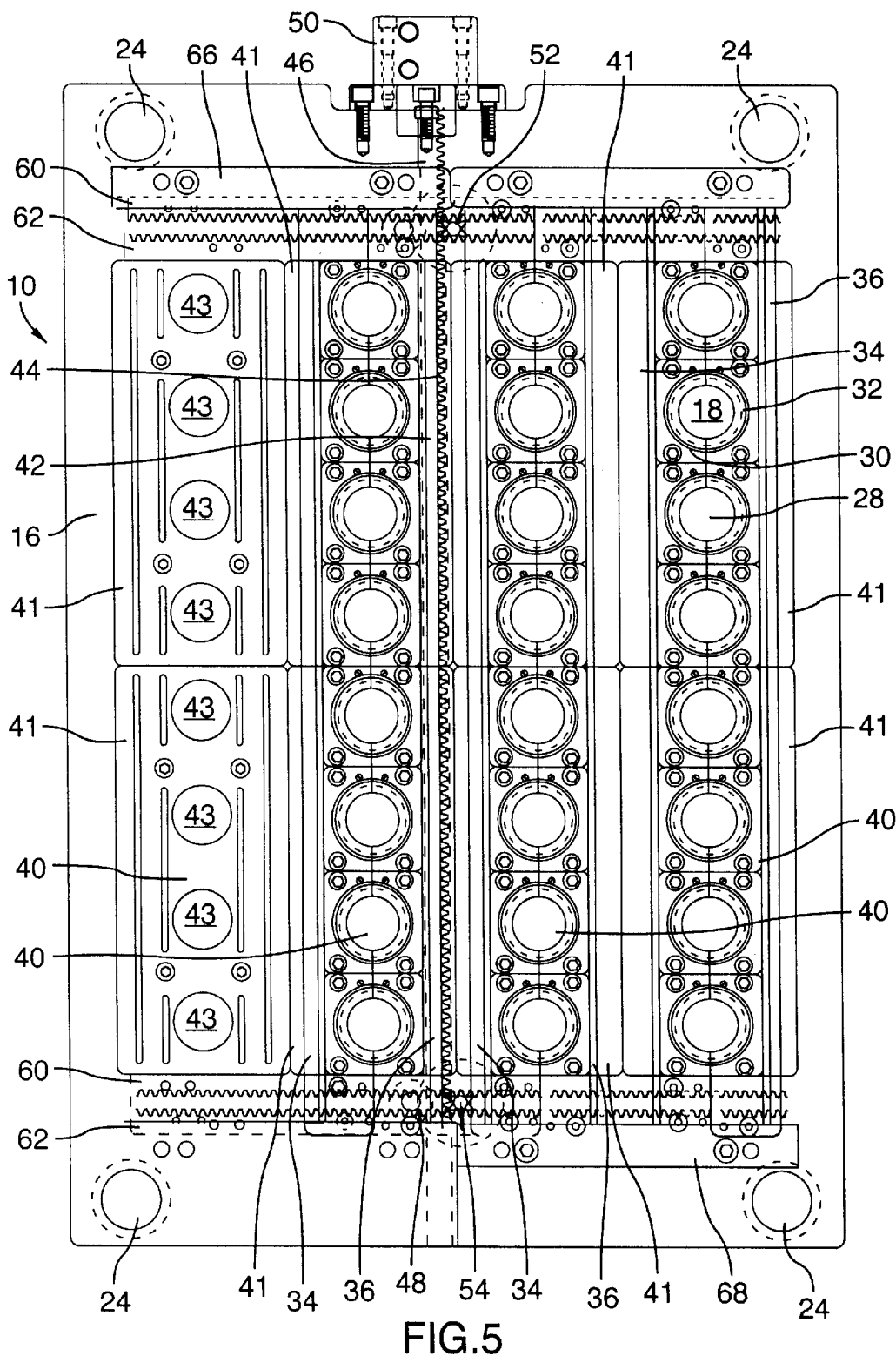
FIG. 5 is a top plan view of a molding apparatus of the present invention, partially disassembled to show details of the slide mechanism.

As illustrated in the plan view of FIG. 5, the molding apparatus 10 preferably comprises a plurality of molds 28 as described above, to permit the simultaneous formation of a number of molded parts 26. Preferably, the molds 28 are arranged in a plurality of spaced, parallel rows 40. In the preferred apparatus 10 shown in the drawings, the mold apparatus 10 comprises four rows 40, each comprising eight molds 28. Thus, mold apparatus 10 is capable of simultaneously forming thirty-two molded parts 26.

In the leftmost row 40 of molds 28 in FIG. 5, the slide bars 34, 36 have been omitted to reveal a pair of apertured wear plates 41 which are bolted to the stripper plate 16. The edges of wear plates 41 are also visible in the other rows 40. The wear plates 41 underlie the slide bars 34, 36 and are provided with apertures 43 which surround the stripper rings 22 and the mold cores 18, this being illustrated in FIGS. 1 to 4.

The molding apparatus 10 also comprises a slide mechanism for moving the slide inserts 30 and 32 between their inner positions (mold closed position) and their outer positions (FIGS. 3 and 4) in which they are separated from the molded part 26.

The slide mechanism includes a driving rack 42 which is mounted in the stripper plate 16. The driving rack 42 comprises an elongate metal bar having a rectangular cross-section, and is provided along one edge with a plurality of teeth 44. The driving rack 42 has a proximal end 46 and a distal end 48, the distance between the distal and proximal ends 46 and 48 being greater than the lengths of the rows 40 of molds 28.

The slide mechanism includes driving means for producing reciprocating movement of the driving rack 42 along a lateral axis which is perpendicular to the machine axis and which is substantially parallel to the rows 40 of molds 28. The driving means preferably comprises a pneumatic cylinder 50 (FIGS. 5 and 8) which is mounted to an outer surface of the stripper plate 16. It will be appreciated that the driving means may comprise any means capable of actuating the driving rack, including hydraulic cylinders. Pneumatic cylinders are however preferred over hydraulic cylinders since leakage of fluid from hydraulic cylinders can cause contamination of the molded parts.

Provided near the respective. ends 46 and 48 of driving rack 42 are a pair of drive pinions 52 and 54. The drive pinions 52 and 54 are mounted in the stripper plate 16 and are rotatable about an axis parallel to the machine axis. As shown in the drawings, the pinions 52, 54 are each mounted on a guide bushing 53, with each pinion and bushing 53 being retained by a pinion retainer plate 55 secured by screws to the stripper plate. The drive pinions 52 and 54 are provided with gear teeth 56 which engage the teeth 44 on driving rack 42 such that movement of the driving rack 42 parallel to the rows 40 of molds 28 causes rotation of drive pinions 52 and 54. Specifically, movement of the driving rack 42 in the direction of arrow A in FIG. 7 causes counter-clockwise rotation of pinions 52, 54 and movement of driving rack 42 in the opposite direction causes clockwise rotation of drive pinions 52 and 54.

Figure 6:
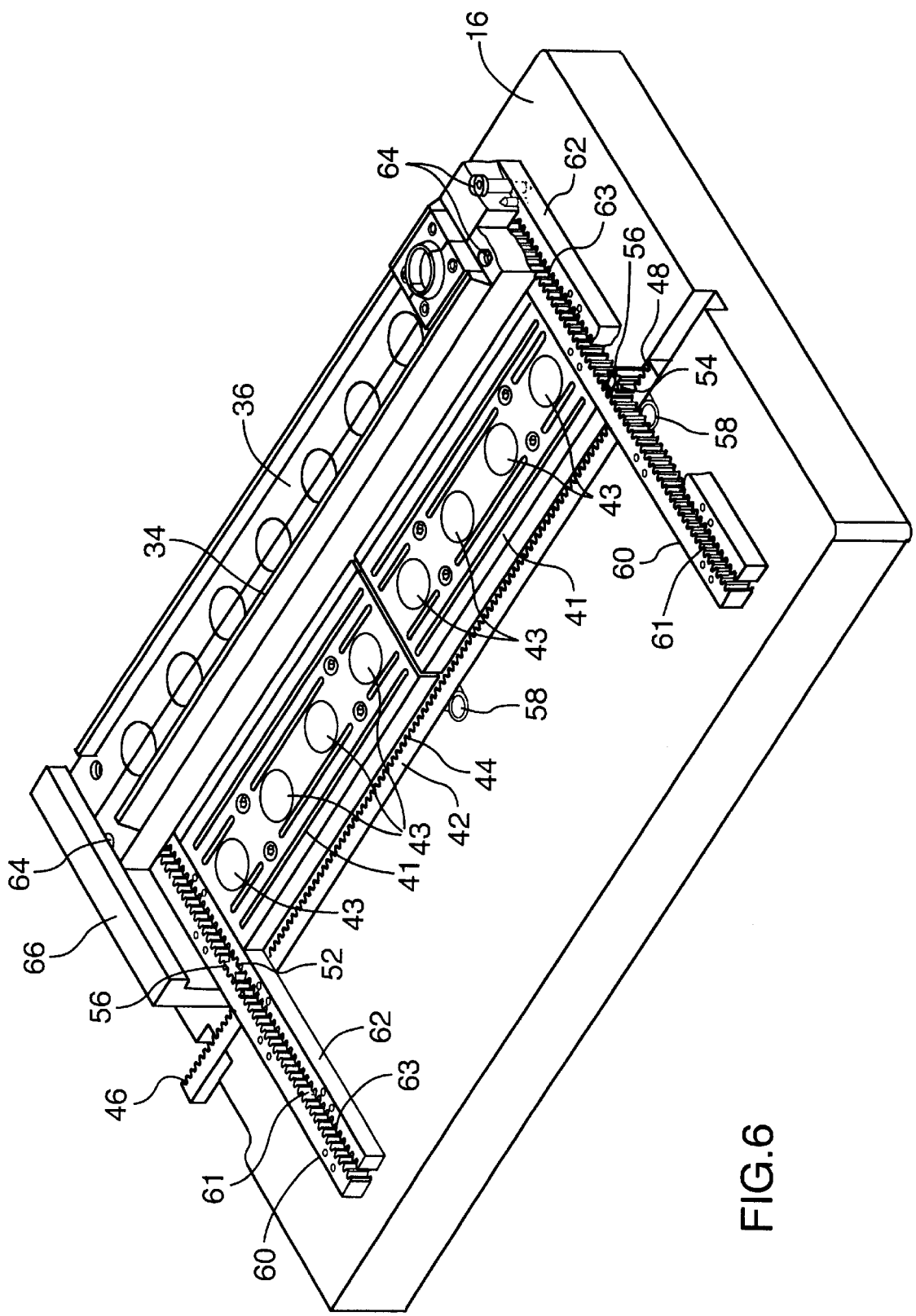
FIG. 6 is a perspective, partially cut away view of a partially disassembled molding apparatus of the present invention, illustrating the preferred slide mechanism, showing details of one pair of slide bars and one pair of slide inserts only.
Figure 7:
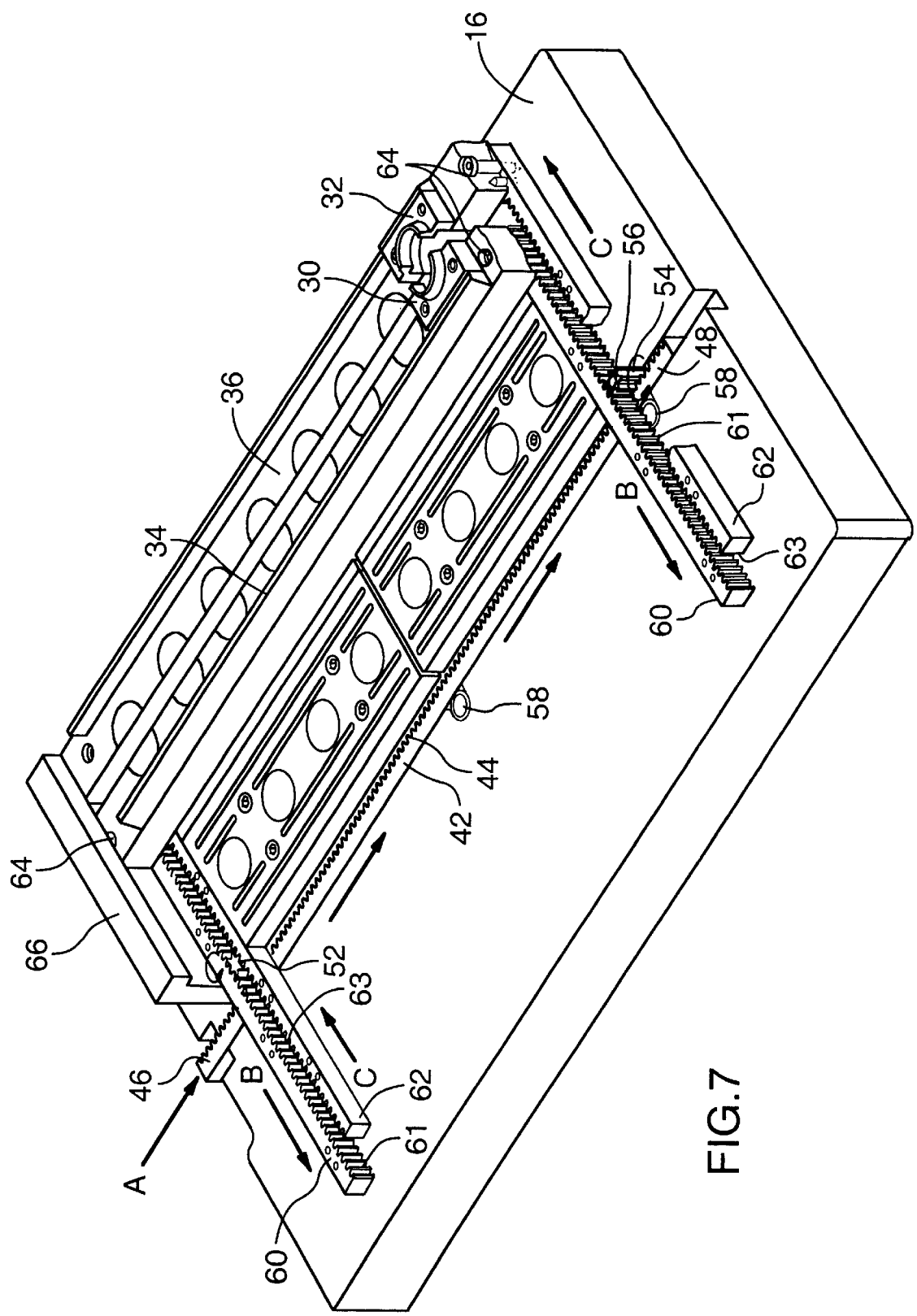
FIG. 7 is a perspective view similar to that of FIG. 6 illustrating the operation of the preferred slide mechanism.

Preferably, engagement between the driving rack 42 and the drive pinions 52, 54 is maintained by rollers 58 provided near each of the drive pinions 52 and 54. Rollers 58 are also mounted in the stripper plate 16 for rotation about an axis parallel to the machine axis. As shown in FIGS. 6 and 7, one or more rollers 58 may also be provided intermediate the ends 46, 48 of driving rack 42.

The slide mechanism further comprises two pairs of driven racks 60 and 62, each having one edge provided with teeth 61 and 63, respectively. As shown in FIGS. 6 and 7 (in which one of the driven racks 62 is partially cut away), one pair of driven racks 60, 62 engages the drive pinion 52 near the proximal end 46 of driving rack 42 for reciprocating movement along an axis which is perpendicular to the machine axis and perpendicular to the rows 40 of molds 28 in response to rotation of drive pinion 52. The driven racks 60 and 62 are spaced from one another and are substantially parallel so that they engage opposite sides of the drive pinion 52. Therefore, rotation of drive pinion 52 results in movement of the driven racks 60 and 62 in opposite directions, as indicated by arrows B and C in FIG. 7. Specifically, when drive pinion 52 rotates in a counter-clockwise direction, rack 60 is driven to the left along arrow B and rack 62 is driven to the right along arrow C. Conversely, when drive pinion 52 rotates in the clockwise direction, rack 60 will be driven to the right and rack 62 will be driven to the left.

An identical pair of driven racks 60 and 62 is provided in engagement with drive pinion 54 at the distal end 48 of driving rack 42. It will be appreciated that the driven racks 60 at the proximal and distal ends of driving rack 42 move in the same direction in response to rotation of drive pinions 52 and 54, and that driven racks 62 at the opposite ends of driving rack 42 also move in the same direction.

As illustrated in the plan view of FIG. 5, the two pairs of driven racks 60, 62 are separated by a distance which is greater than the lengths of the rows 40 and extend across the tops and bottoms of all of the rows 40.

The slide bars 34 and 36 are mounted on the stripper plate 16 for reciprocal movement towards and away from the mold core 18. The slide bars are movable along an axis which is perpendicular to the machine axis and which is also perpendicular to the rows 40 of molds 28 and to the longitudinal directions of the slide bars 34, 36. As shown in FIGS. 6 and 7, the slide bars 34, 36 extend across the two pairs of driven racks 60, 62, with the slide bar 34 being attached at its opposite ends to both driven racks 60, and slide bar 36 being attached at its opposite ends to both driven racks 62. Therefore, the slide bars 34, 36 simultaneously move inward and outward in relation to the mold core 18 in response to movement of driven racks 60 and 62 in opposite directions.

Figure 8:
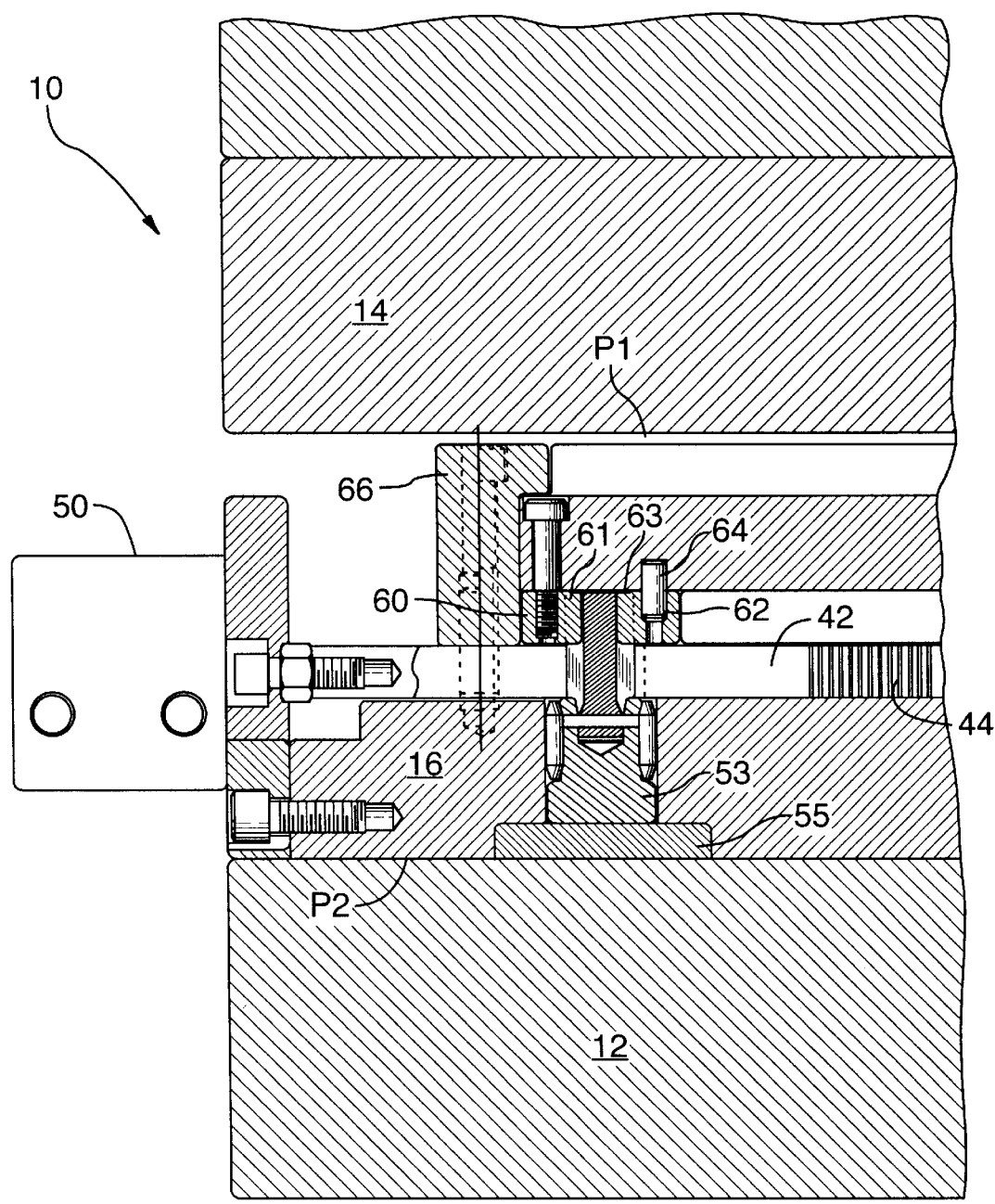
FIG. 8 is an enlarged cross-sectional view through the molding apparatus of FIG. 1 in a plane parallel to the driving rack, showing the sliding mechanism at the proximal end of the driving rack and omitting, for clarity, some of the teeth of the driving rack.
Figure 9:
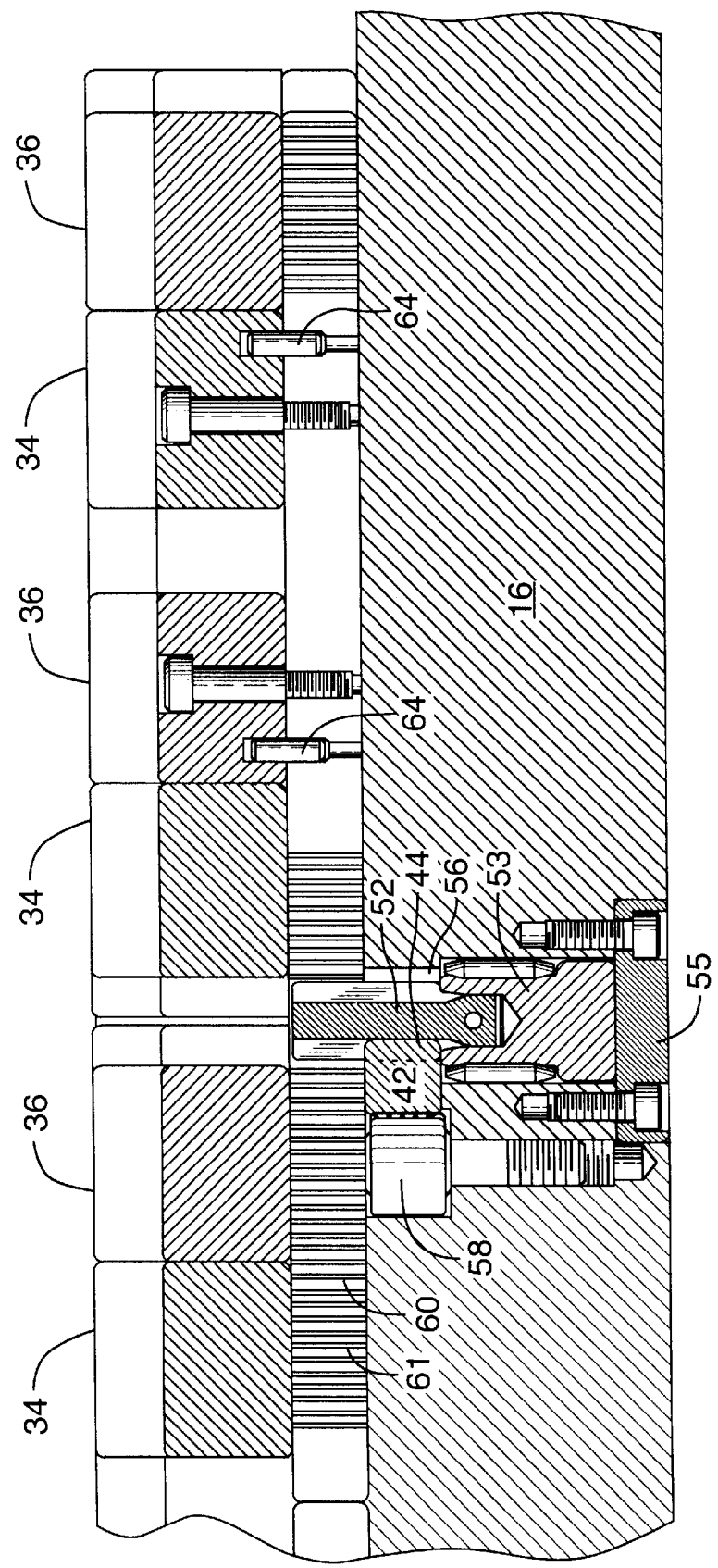
FIG. 9 is an isolated, enlarged cross-sectional view of the stripper plate and the slide mechanism of the molding apparatus of FIG. 1 in a plane perpendicular to the driving rack, showing the slide mechanism at the proximal end of the driving rack and omitting, for clarity, some of the teeth of the driven rack.

As illustrated in FIGS. 6 to 8, the slides 34, 36 are retained on pins 64 which project upwardly above the upper surfaces of driven racks 60 and 62. The ends of the slide bars 34, 36 are prevented from being released from driven racks 60, 62 by gibs 66, 68 which are bolted to the stripper plate 16 at opposite ends of the slide bars 34, 36. Gib 68 near the distal end 48 of driving rack 42 is shown partially cut away in FIG. 5.

Figure 2:
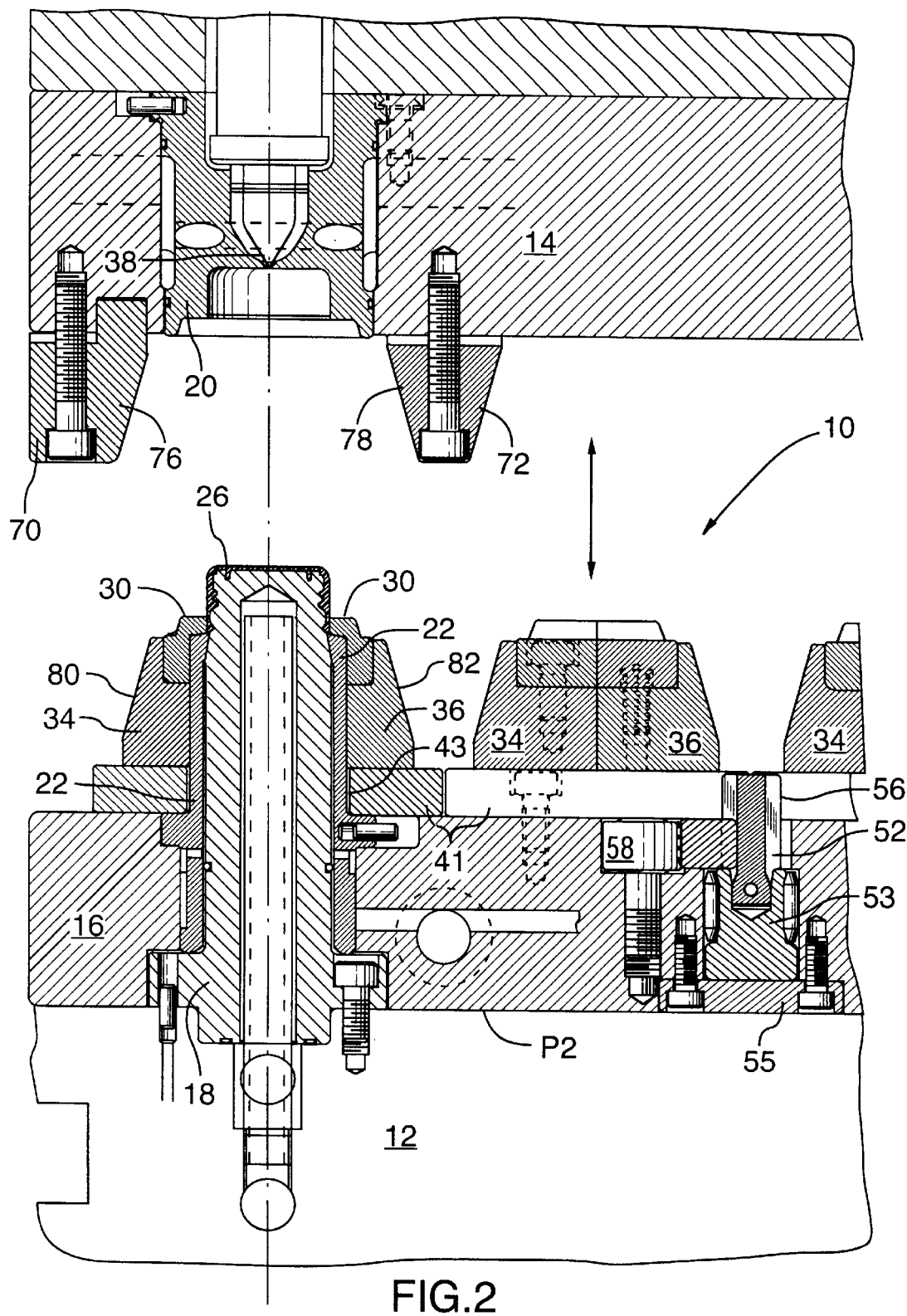
FIG. 2 is a cross-sectional view in the same plane as FIG. 1 showing the mold of FIG. 1 with the cavity plate separated from the stripper plate.

As best illustrated in FIGS. 1 and 2, provided along the first parting line P1 is a series of locking wedges, including wedges 70 and 72. The single acting locking wedge 70 and double acting locking wedge 72 have sloped inner surfaces 76 and 78 (FIG. 2) respectively which engage sloped outer surfaces 80 and 82 (FIG. 2) of slide bars 34 and 36 respectively. Thus, when the cavity plate 14 and stripper plate 16 abut one another in the mold closed position of FIG. 1, the locking wedges 70 and 72 firmly retain the slide bars 34 and 36 in place to prevent outward displacement of the slide bars and the slide inserts 30 and 32.

A molding operation utilizing apparatus 10 will now be described below with reference to the drawings.

With the mold 28 in the mold closed position as shown in FIG. 1, molten plastic is injected under pressure into mold 28 from injection nozzle 38 to form molded part 26. The mold is subsequently opened and the part ejected by the following sequence of steps:

1. The cavity plate 14 and stripper plate 16 are separated along parting line P1 as shown in FIG. 2. As discussed above, this is preferably accomplished by mold opening along the machine axis, leaving the molded part 26 attached to the core 18.

2. With the mold open along parting line P1 and locking wedges withdrawn as in FIG. 2, the pneumatic cylinder 50 is activated to push the driving rack 42 in a direction away from cylinder 50, thereby causing rotation of pinions 52, 54 and translation of driven racks 60, 62 as described above.

Figure 3:
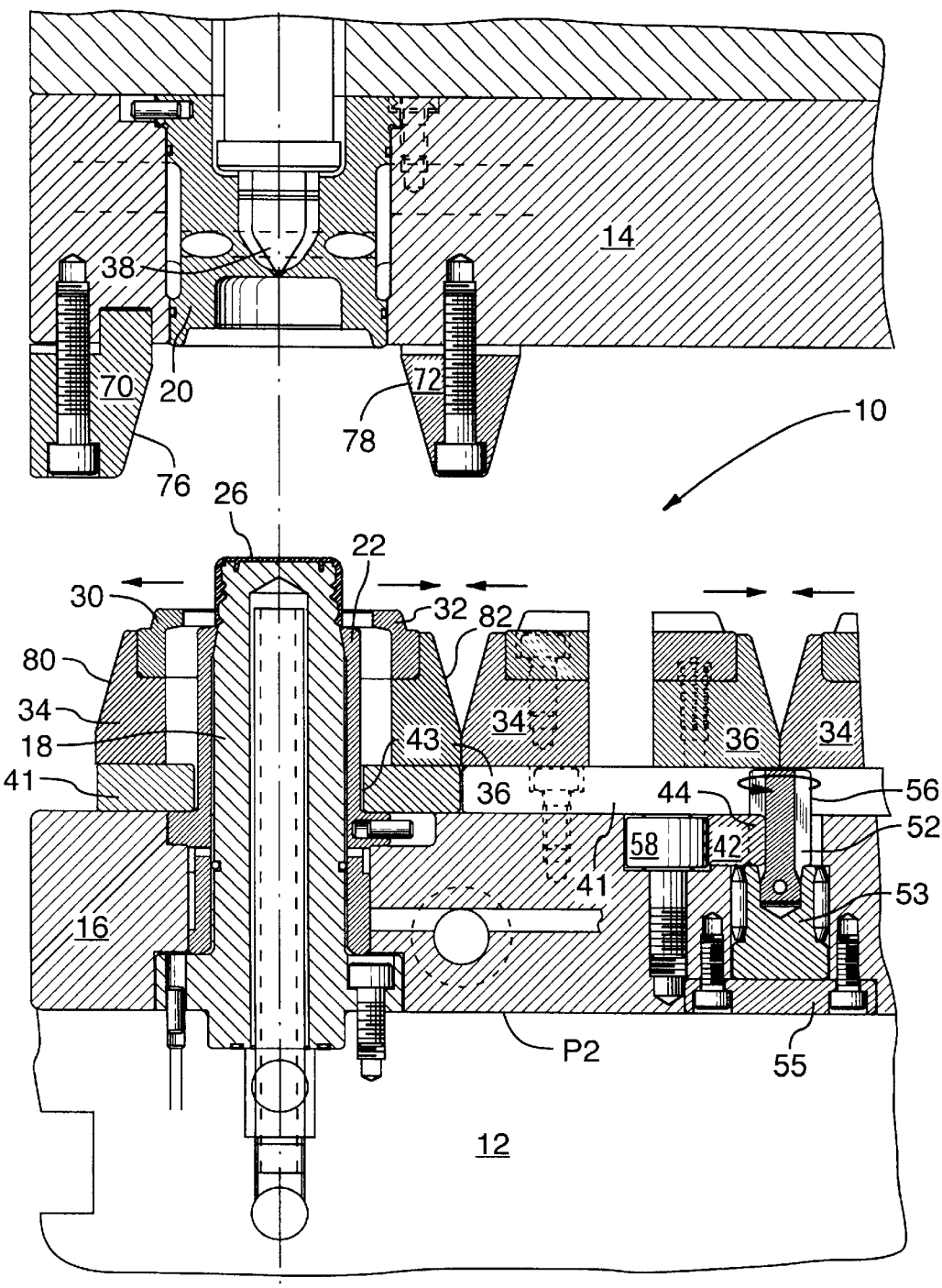
FIG. 3 is a cross-sectional view in the same plane as FIG. 1 showing the mold of FIG. 2 with the slides and the slide inserts moved laterally to their outer positions.

This results in the slide bars 34, 36 being moved from their inner positions to their outer positions, as illustrated in FIG. 3.

Figure 4:
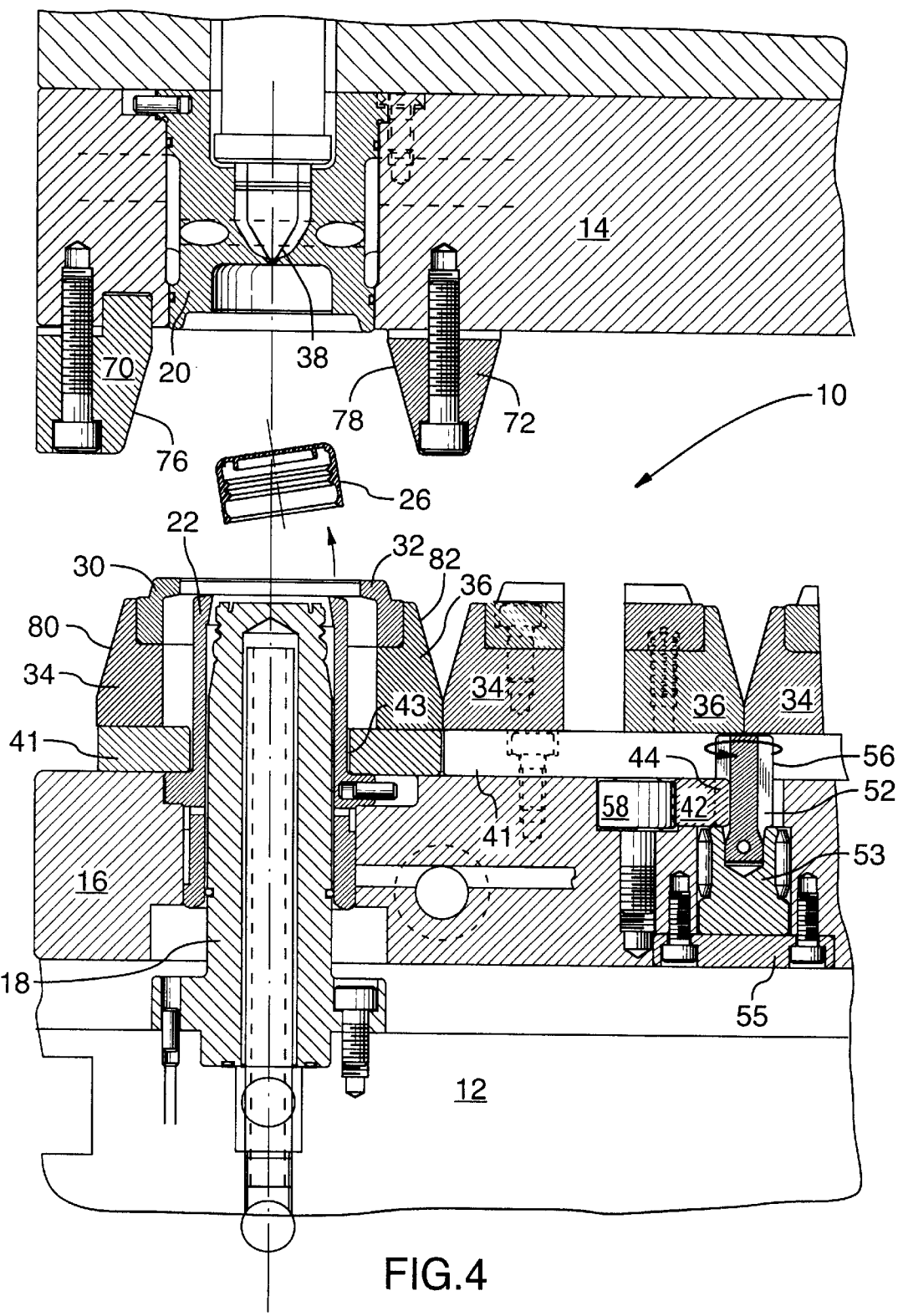
FIG. 4 is a cross-sectional view in the same plane as FIG. 1 showing the mold of FIG. 3 with the stripper plate separated from the core plate to advance the stripper ring along the machine axis and eject the molded part from the core.

3. With the slide bars 34 and 36 and associated slide inserts 30 and 32 moved to the outer positions as shown in FIG. 3, the stripper ring 22 is advanced axially upward by separation of stripper plate 16 from core plate 12, thereby ejecting the molded part 26 from core 18 as shown in FIG. 4

The mold is again closed for the next molding operation by bringing core plate 12 and stripper plate 16 together along parting line P2, followed by activation of pneumatic cylinder 50 to move the driving rack 42 in the opposite direction to the mold opening step, resulting in movement of the slide bars 34, 36 and slide inserts 30, 32 to the inner position, and then bringing together the cavity plate 14 and stripper plate 16 along parting line P1, to close the mold 28.

Since actuation of the slide mechanism is independent of the opening and closing of the mold, the order of the above steps can be varied somewhat. For example, the slide mechanism could be actuated during mold opening and closing to further decrease the mold cycle time. This would not, however, require slowing down of the mold opening and closing step since the slide mechanism is operated independently.

Although the invention has been described in connection with a molding apparatus having a certain number of molds, it will be appreciated that the invention can be applied to a molding apparatus having any number of molds, including an apparatus having only one mold.

Although the invention has been described in connection with a molding apparatus which utilizes a stripper plate and a stripper ring, it will be appreciated that the present invention could be applied to a molding apparatus having two mold plates which form a one or more molds, with the slide mechanism of the present invention could be mounted in either of the mold plates.

It is also conceivable that a molding apparatus according to the invention could be configured with only one drive pinion and one pair of driven racks, for example where the apparatus contains relatively few molds such that the slides are relatively short.

Although the invention has been described in connection with certain preferred embodiments, it is not to be limited thereto. Rather, the invention is intended to encompass all embodiments which may fall within the scope of the following claims.

What is claimed is:

1. A molding apparatus for forming a molded article, comprising:
   (a) a first mold plate having a first mold component;
   (b) a second mold plate having a second mold component, one or both of said first and second mold plates being movable along a machine axis to move said mold plates between a mold closed position and a mold open position;
   (c) a pair of laterally movable mold elements movable toward and away from one another along a first lateral axis between an inner position and an outer position, said first lateral axis being substantially perpendicular to said machine axis, such that, when said laterally movable mold elements are in their inner positions and the mold plates are in the mold closed position, the first and second mold elements and the pair of laterally movable mold elements together comprise a mold in which said molded article is formed; and
   (d) a slide mechanism for moving said pair of laterally movable mold elements between said inner and outer positions, said slide mechanism comprising:
      (i) a driving rack being movable in a reciprocal manner along a second lateral axis which is perpendicular to the machine axis and the first lateral axis;
      (ii) driving means for reciprocating said driving rack along said second lateral axis;
      (iii) a drive pinion being rotatable about an axis parallel to the machine axis and engaging the driving rack such that reciprocal movement of the driving rack causes rotation of the drive pinion;
      (iv) a first driven rack engaging the drive pinion and being movable in a reciprocal manner along an axis parallel to the first lateral axis in response to rotation of the drive pinion;
      (v) a second driven rack engaging the drive pinion and being movable in a reciprocal manner along an axis parallel to the first lateral axis in response to rotation of the drive pinion, said second driven rack being spaced from the first driven rack and substantially parallel thereto such that rotation of the drive pinion results in reciprocal movement of the first and second driven racks in opposite directions; and
      (vi) a pair of slides mounted for reciprocal movement along an axis parallel to the first lateral axis, one of the slides being attached to the first driven rack and the other of the slides being attached to the second driven rack, each of the slides also being attached to one of the pair of laterally movable mold elements such that the laterally movable mold elements are moved between their inner and outer positions in response to said reciprocal movement of the slides.

2. A molding apparatus according to claim 1, wherein the first mold plate comprises a core plate and the first mold component comprises a mold core.

3. A molding apparatus according to claim 2, wherein the second mold plate comprises a cavity plate and the second mold component comprises a mold cavity.

4. A molding apparatus according to claim 3, further comprising a third mold plate mounted between said core plate and said cavity plate.

5. A molding apparatus according to claim 4, wherein said third mold plate comprises a stripper plate having an annular stripper ring for stripping said molded article from the mold core, said stripper ring surrounding said mold core.

6. A molding apparatus according to claim 5, wherein said mold further comprises an upper annular surface of said stripper ring.

7. A molding apparatus according to claim 4, wherein said slide mechanism is at least partially recessed in said third mold plate.

8. A molding apparatus according to claim 1, wherein said laterally movable mold elements comprise slide inserts which form an undercut portion of the molded article.

9. A molding apparatus according to claim 4, wherein a plurality of locking wedges are provided along a parting line between the cavity plate and the third mold plate.

10. A molding apparatus according to claim 9, wherein said plurality of locking wedges are connected to said cavity plate and project into wedge-shaped recesses in the third mold plate.

11. A molding apparatus according to claim 10, wherein each said wedge-shaped recess in the third mold plate includes a sloped outer wall of a slide, the sloped outer wall of the slide abutting a surface of one of the locking wedges in the mold closed position.

12. A molding apparatus according to claim 1, wherein said driving means comprises a pneumatic cylinder connected to an end of the driving rack.

13. A molding apparatus according to claim 4, wherein said driving means comprises a pneumatic cylinder connected to an end of the driving rack, and wherein the pneumatic cylinder is mounted to an outer surface of the third mold plate.

14. A molding apparatus for forming molded articles, comprising:
   (a) a first mold plate having a plurality of mold cavities;
   (b) a second mold plate having a plurality of mold cores, one or both of said first and second mold plates being movable along a machine axis to move said mold plates between a mold closed and a mold open position;
   (c) a plurality of pairs of laterally movable mold elements, the mold elements of each pair being movable toward and away from one another along a first lateral axis between an inner position and an outer position, said first lateral axis being substantially perpendicular to said machine axis such that, when each said pair of laterally movable mold elements are in their inner positions and the mold plates are in the mold closed position, a plurality of molds are formed, each mold comprising a mold core, a mold cavity and a pair of laterally movable mold elements, said molds being arranged in one or more substantially straight rows extending substantially perpendicular to said first lateral axis;
   (d) a slide mechanism for moving said plurality of pairs of laterally movable mold elements between said inner and outer positions, said slide mechanism comprising:
      (i) a driving rack being movable in a reciprocal manner along a second lateral axis which is substantially perpendicular to the machine axis and the first lateral axis, said driving rack having a proximal end and a distal end;
      (ii) driving means for reciprocating said driving rack along said second lateral axis;
      (iii) a pair of drive pinions, each being rotatable about an axis parallel to the machine axis and engaging the driving rack such that reciprocal movement of the driving rack causes rotation of the drive pinions, said drive pinions being spaced from one another along said driving rack;

(iv) two pairs of driven racks, each pair comprising a first driven rack and a second driven rack engaging one of the drive pinions and being movable in a reciprocal manner along an axis parallel to the first lateral axis in response to rotation of the drive pinion, the first and second driven rack of each pair being spaced from one another and substantially parallel thereto such that rotation of the drive pinion results in reciprocal movement of the first and second driven racks in opposite directions; and (v) a plurality of pairs of slides mounted for reciprocal movement along an axis parallel to the first lateral axis, each pair of slides including a first slide attached to both said first driven racks and a second slide attached to both said second driven racks, each of the slides also being attached to one of a pair of said laterally movable mold elements such that the laterally movable mold elements are moved between their inner and outer positions in response to said reciprocal movement of the slides.

15. A molding apparatus according to claim 14, wherein said pairs of driven racks are substantially parallel to one another and are separated by a distance greater than a length of each of said rows.

16. A molding apparatus according to claim 14, wherein said slides comprise elongate bars extending between the pairs of driven racks.

17. A molding apparatus according to claim 14, wherein one of the pair of drive pinions is located near the proximal end of the driving rack, and another of the pair of drive pinions is located near the distal end of the driving rack.

18. A molding apparatus according to claim 14, wherein said driving means comprises a pneumatic cylinder which is attached to one of the proximal end and the distal end of the driving rack.

* * * * *